Patented Oct. 11, 1927.

1,644,851

UNITED STATES PATENT OFFICE.

HEINRICH NERESHEIMER, OF LUDWIGSHAFEN-ON-THE-RHINE, AND HANS EMMER, OF MANNHEIM, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY.

MANUFACTURE OF BENZANTHRONE DERIVATIVES CONTAINING SULPHUR.

No Drawing. Application filed February 9, 1926, Serial No. 87,168, and in Germany March 7, 1925.

We have found that new benzanthrone derivatives containing sulphur can be obtained by treating Bz-1-halogen-benzanthrones corresponding to the formula

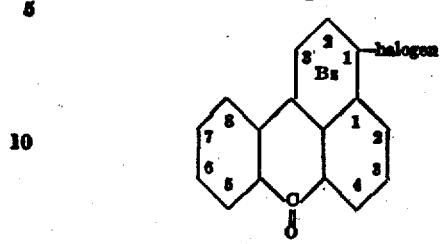

which may also contain further substituents, with hydrosulphites or with compounds acting like hydrosulphites under the conditions of working as for example aldhyde sulphoxylates, which latter compounds are herein deemed to be included in the term "hydrosulphite". Preferably the reaction is carried out in a neutral or alkaline solution using such solvents or diluents as are capable of dissolving both the inorganic and organic components of the reaction, for example aqueous alcohols. The reaction may however also be carried out in an aqueous suspension.

The new compounds are sulphinic acids of the benzanthrone series. Their salts are readily transformed into the salts of the corresponding sulphonic acids by oxidation in an aqueous solution. By a reducing treatment for example with an aqueous solution of sodium poly-sulphides the corresponding benzanthronyl-mercaptans are obtained, while by the action of sodium sulphide at about 70 degrees to 80 degrees centigrade Bz-1.Bz-1'-benzanthronyl-sulphides and at higher temperatures isodibenzanthrones are obtained as well as the said mercaptans. Isodibenzanthrones are also obtained by fusing the sulphinic acids or their alkyl or acyl derivatives obtainable by alkylation or acylation of the sulphinic acids, with alkali metal alcoholates. When heated with inert diluents of a high boiling point, for example paraffine oil, the sulphinic acids are transformed into Bz-1.Bz-1'-benzanthronyl-sulphides, while by heating with sulphuric acid of 60 degrees Baumé at water-bath temperature, Bz-1.Bz-1'-benzanthronyl-disulphides are obtained which can also be prepared by the action of metals as for example copper or aluminium powder and concentrated sulphuric acid at room temperature.

By reason of the properties above referred to the new benzanthrone derivatives containing sulphur are valuable intermediates for the production of dyestuffs of the benzanthrone series.

The following examples will further illustrate how the invention may be carried out in practice, but the invention is not limited to these examples. The parts are by weight.

Example 1.

10 parts of finely divided Bz-1-chlor-benzanthrone are stirred with 200 parts of methanol, 70 parts of 20 per cent aqueous ammonia and 10 parts of dry anhydrous sodium hydrosulphite at about 35 degrees to 40 degrees centigrade until a test portion when diluted with water leaves only very little undissolved matter or none at all. The reaction probably takes place according to the following equation:

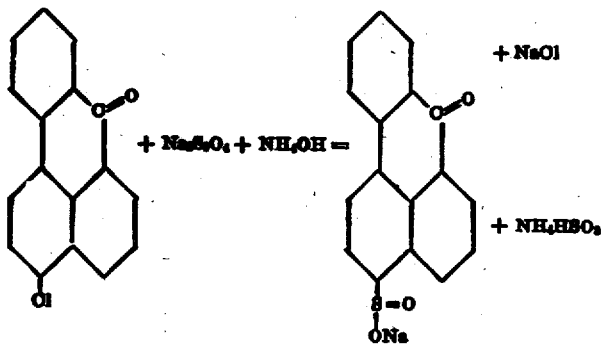

The alcohol is then distilled off, the residue dissolved in hot water at the same time introducing air, and the solution, if necessary after filtering off some unaltered chlor-benzanthrone, is acidulated. The resulting precipitate when dry forms a brownish yellow powder which dissolves difficultly in water but readily in dilute alkalis with a yellow color. By recrystallization from ethyl alcohol it is obtained in crystals melting at about 225 degrees centigrade. When oxidized in an aqueous solution it is transformed into benzanthrone-sulphonic acid.

Example 2.

10 parts of finely divided Bz-1-brom-benzanthrone are heated for some hours with 200 parts of water, 70 parts of 20 per cent aqueous ammonia and 10 parts of sodium hydrosulphite to about 90 degrees to 95 degrees centigrade. Unaltered brom-benzanthrone is then filtered off from the hot mixture, which is then treated with air in order to oxidize any unaltered hydrosulphite, cooled and acidulated with hydrochloric acid. The precipitated product is identical with that described in Example 1.

Example 3.

A mixture of 10 parts of finely divided Bz-1-chlorbenzanthrone, 20 parts of sodium hydrosulphite and 400 parts of 50 per cent ethyl alcohol is stirred for some hours at 60 degrees to 70 degrees centigrade while excluding air. The reaction product is separated as described in Example 1.

Example 4.

10 parts of Bz-1-brom-benzanthrone, 200 parts of ethyl alcohol, 400 parts of water, 25 parts of a 35 per cent caustic soda solution and 20 parts of sodium formaldehyde sulphoxylate are treated in the manner described in Example 3.

What we claim is:

1. The process of manufacturing new benzanthrone derivatives which consists in treating Bz-1-halogen-benzanthrones with a hydrosulphite at so low a temperature that no further conversion of the resulting sulphinic acids takes place.

2. As new articles of manufacture, Bz-1-benzanthrone sulphinic acids.

3. As new article of manufacture, Bz-1-benzanthrone sulphinic acid having the formula

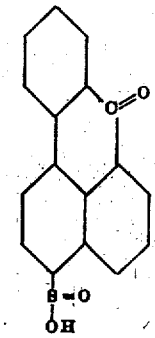

In testimony whereof we have hereunto set our hands.

HEINRICH NERESHEIMER.
HANS EMMER.

powder which dissolves difficultly in water but readily in dilute alkalis with a yellow color. By recrystallization from ethyl alcohol it is obtained in crystals melting at about 225 degrees centigrade. When oxidized in an aqueous solution it is transformed into benzanthrone-sulphonic acid.

*Example 2.*

10 parts of finely divided Bz-1-brom-benzanthrone are heated for some hours with 200 parts of water, 70 parts of 20 per cent aqueous ammonia and 10 parts of sodium hydrosulphite to about 90 degrees to 95 degrees centigrade. Unaltered brom-benzanthrone is then filtered off from the hot mixture, which is then treated with air in order to oxidize any unaltered hydrosulphite, cooled and acidulated with hydrochloric acid. The precipitated product is identical with that described in Example 1.

*Example 3.*

A mixture of 10 parts of finely divided Bz-1-chlorbenzanthrone, 20 parts of sodium hydrosulphite and 400 parts of 50 per cent ethyl alcohol is stirred for some hours at 60 degrees to 70 degrees centigrade while excluding air. The reaction product is separated as described in Example 1.

*Example 4.*

10 parts of Bz-1-brom-benzanthrone, 200 parts of ethyl alcohol, 400 parts of water, 25 parts of a 35 per cent caustic soda solution and 20 parts of sodium formaldehyde sulphoxylate are treated in the manner described in Example 3.

What we claim is:

1. The process of manufacturing new benzanthrone derivatives which consists in treating Bz-1-halogen-benzanthrones with a hydrosulphite at so low a temperature that no further conversion of the resulting sulphinic acids takes place.

2. As new articles of manufacture, Bz-1-benzanthrone sulphinic acids.

3. As new article of manufacture, Bz-1-benzanthrone sulphinic acid having the formula

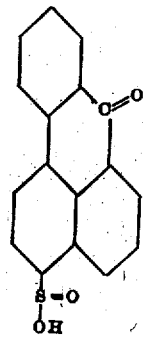

In testimony whereof we have hereunto set our hands.

HEINRICH NERESHEIMER.
HANS EMMER.

CERTIFICATE OF CORRECTION.

Patent No. 1,644,851.  Granted October 11, 1927, to

HEINRICH NERESHEIMER ET AL.

It is hereby certified that the above numbered patent was erroneously issued to "I. G. Farbenindustrie Aktiengesellschaft, of Frankfort-on-the-Main, Germany, a Corporation of Germany", whereas said patent should have been issued to "Grasselli Dyestuff Corporation, of New York, N. Y., a Corporation of Delaware", said Corporation being assignee by mesne assignments of the entire interest in said invention, as shown by the records of assignments in this office; and that the said Letters Patent should be read with this correction therein that the same may conform to the record of the case in the Patent Office.

Signed and sealed this 8th day of November, A. D. 1927.

Seal.

M. J. Moore,
Acting Commissioner of Patents.

CERTIFICATE OF CORRECTION.

Patent No. 1,644,851.            Granted October 11, 1927, to

HEINRICH NERESHEIMER ET AL.

It is hereby certified that the above numbered patent was erroneously issued to "I. G. Farbenindustrie Aktiengesellschaft, of Frankfort-on-the-Main, Germany, a Corporation of Germany"; whereas said patent should have been issued to "Grasselli Dyestuff Corporation, of New York, N. Y., a Corporation of Delaware", said Corporation being assignee by mesne assignments of the entire interest in said invention, as shown by the records of assignments in this office; and that the said Letters Patent should be read with this correction therein that the same may conform to the record of the case in the Patent Office.

Signed and sealed this 8th day of November, A. D. 1927.

Seal.                                                  M. J. Moore,
                                                                Acting Commissioner of Patents.